(12) United States Patent
Western

(10) Patent No.: US 9,936,156 B2
(45) Date of Patent: Apr. 3, 2018

(54) VOLUME ADJUSTING APPARATUS AND METHOD

(71) Applicant: Samantha Western, Gaithersburg, MD (US)

(72) Inventor: Samantha Western, Gaithersburg, MD (US)

(*) Notice: Subject to any disclaimer, the term of this patent is extended or adjusted under 35 U.S.C. 154(b) by 0 days.

(21) Appl. No.: 15/276,721

(22) Filed: Sep. 26, 2016

(65) Prior Publication Data

US 2017/0094215 A1 Mar. 30, 2017

Related U.S. Application Data

(60) Provisional application No. 62/222,900, filed on Sep. 24, 2015.

(51) Int. Cl.
| | |
|---|---|
| *H04N 5/44* | (2011.01) |
| *G06F 3/16* | (2006.01) |
| *H04N 5/60* | (2006.01) |

(52) U.S. Cl.
CPC ........... *H04N 5/4403* (2013.01); *G06F 3/165* (2013.01); *H04N 5/60* (2013.01); *H04N 2005/4412* (2013.01); *H04N 2005/4435* (2013.01)

(58) Field of Classification Search
CPC .............. H04N 5/4403; H04N 5/60; H04N 2005/4412; H04N 2005/4435; G06F 3/165
USPC ........................................................ 348/734
See application file for complete search history.

(56) References Cited

U.S. PATENT DOCUMENTS

| | | | | |
|---|---|---|---|---|
| 5,369,440 A * | 11/1994 | Sussman | ................ | H04N 5/60 348/632 |
| 6,552,753 B1 * | 4/2003 | Zhurbinskiy | ............ | H04N 5/60 348/725 |
| 2003/0043051 A1 * | 3/2003 | Shiraishi | ................ | H04S 7/301 340/4.41 |
| 2003/0204857 A1 * | 10/2003 | Dinwiddie | ............... | H04N 5/44 725/134 |
| 2009/0066855 A1 * | 3/2009 | Kumano | ............. | H04N 5/4403 348/734 |
| 2010/0195002 A1 * | 8/2010 | Chen | .................... | H03G 3/3005 348/738 |
| 2011/0051016 A1 * | 3/2011 | Malode | .................... | H03G 1/02 348/734 |
| 2011/0093882 A1 * | 4/2011 | Candelore | .............. | H04N 7/163 725/28 |

(Continued)

*Primary Examiner* — Michael Lee
(74) *Attorney, Agent, or Firm* — Doster Greene, LLC

(57) ABSTRACT

The present invention consists of a volume adjusting apparatus and method which automatically regulates a volume output of an electronic device. The volume adjusting apparatus comprises a microprocessor for detecting the volume output of the electronic device, a memory unit for storing the volume output received in the microprocessor, a wireless transmitter for transmitting a plurality of command signals to the electronic device and an electronic control unit. The electronic control unit further configured to transmit via the wireless transmitter the plurality of command signals to the electronic device. At least one recall button installed with the volume adjusting apparatus enables a user to maintain the same average volume across all channels. The method effectively ensures a volume consistency by adjusting the volume on a current television channel based on the volume of previous channel of the electronic device.

3 Claims, 3 Drawing Sheets

(56) References Cited

U.S. PATENT DOCUMENTS

2013/0033647 A1* 2/2013 Yuan .................. H04N 21/4852
                                                  348/731
2016/0127675 A1* 5/2016 Ahn .................... H04N 5/4403
                                                  348/734

* cited by examiner

VOLUME ADJUSTING APPARATUS AND METHOD

RELATED APPLICATIONS

This application claims priority of U.S. Provisional Patent Application No. 62/222,900, which was filed on Sep. 24, 2015. The subject matter of the earlier filed application is hereby incorporated by reference.

BACKGROUND OF THE INVENTION

Field of the Invention

The present invention relates to volume adjustments, and particularly to an electronic control apparatus and method capable of automatically adjusting the volume of a device.

Description of the Prior Art

Automatic volume control technology is gaining popularity for use with various types of sound-emitting electronic equipment such as televisions and audio equipment. The function of adjusting the sound volume is the one used most frequently in these electronic devices. There are many scenarios under which a user may be required to adjust the volume output, for example, of the television to maintain the volume within a desired range and to compensate for changes in listening conditions.

A digital television is often switched to play programs of different channels, each of which may provide varying volume levels. As the number of television channels has increased, so have the inconsistencies in the volume levels. Listeners must constantly readjust the volume on their remote controllers to maintain consistent volume levels as they switch among television channels. Listeners often experience problems with spikes in volume across programming and commercials. Even content within the same program can vary in level, often dramatically, requiring even more volume control adjustments. Thus, while the burden is significantly lessened through the use of a remote control, a burden is still placed on the user to continually adjust the volume output of the television to maintain the volume within a desired listening range.

Conventional audio level control devices provide for adjusting the audio level of a device such as radio and television in response to changes in ambient sound levels. A microprocessor monitors the ambient sound produced by an audio device using a microphone to determine average low and high audio thresholds. When the ambient sound level is outside the threshold range, the microprocessor transmits volume control signals using an infrared emitter to the audio device to sustain a user-defined average audio level. Even so, this apparatus fails to maintain the user's preferred volume level across all channels, all program sources, and all content. The automatic audio level control device cannot adjust the volume on a current television channel based on the volume of previous channels to ensure volume consistency. Moreover, such an apparatus is not adaptable to provide the option for the user to select a preferred volume level and further fails to program the remote controller to the user's preset volume level.

Another approach describes an automatic remote control device and method which compensates for ambient, environmental noise changes and sudden changes in program material volume. The microprocessor located in the remote control device utilizes the received sound level and the total received noise level to calculate a reference sound-to-noise ratio. If a volume up/down control is pressed by the operator, the remote control device sends the appropriate signal to the sound-emitting device to increase or decrease the sound level, and a new reference sound-to-noise ratio is calculated. If the sound-to-noise ratio has changed, then the remote control device sends the appropriate signal to the sound-emitting device to adjust the sound level so that the original sound-to-noise ratio is maintained. Also, the user may need to either enter the channel number or press the mute button of the remote controller to maintain the unexpected volume variations while viewing a television program. Such a remote controller does not include a recall button to enables the user to maintain the same average volume level while switching between two channels. Moreover, this method does not possess any defined buttons to adjust the volume to preset levels.

Yet another approach discloses a volume adjusting method for channel switching of a digital television. The method comprises comparing a first remembered volume used for a first channel with a second remembered volume used for a second channel, while a digital television receives a first command for switching from the first channel to the second channel. The digital television using the first remembered volume in advance to play a first program of the second channel, while the first remembered volume is not equal to the second remembered volume. The problem with this method is that it does not enable the user to create a user preferred adult censored word list such that the volume automatically adjusts to mute when such content airs in a pre-recorded program. Moreover, such an apparatus is not adaptable for the user to program the visual display to censor text for adult users to read on the television screen, while the audio is muted from younger viewers who are not yet able to read such censored content. The existing prior art devices fail to satisfactorily accommodate these competing requirements.

Therefore, there remains a need for a remote controller and a remote control system for automatically adjusting the volume on a current television channel based on the volume of previous channels to ensure a volume consistency. Such a volume adjusting apparatus may provide a recall button to enables the user to maintain the same average volume while switching between two channels without entering the channel number or pressing the mute button. Such an apparatus may include multiple recall buttons, wherein each recall button is preset at a different volume level. This device may continuously monitor and adjust the audio to maintain the listener's preferred volume level across all channels, all program sources, and all content. Further, such a device may enable the user to create an adult censored word list such that the volume automatically adjusts to mute when such content airs in a pre-recorded program. Such an apparatus may be adaptable for the user to program the visual display of the censored text for adult users to read on the television screen, while the audio is muted from younger viewers. The present embodiment overcomes prior art shortcomings by accomplishing these critical objectives.

SUMMARY OF THE DISCLOSURE

To minimize the limitations found in the prior art, and to minimize other limitations that will be apparent upon the reading of the specification, the present invention consists of a volume adjusting apparatus and method which automatically regulates a volume output of an electronic device. The volume adjusting apparatus comprises a microprocessor for detecting the volume output of the electronic device, a memory unit for storing the volume output received in the microprocessor, a wireless transmitter for transmitting a plurality of command signals to the electronic device and an electronic control unit. Preferably, the wireless transmitter transmits wireless signals to the receiver. Therefore, in various embodiments, no wires are required between the transmitter and the electronic device. However, the transmitter can also be connected by wires to the electronic device, if desired. The electronic control unit is configured to transmit via the wireless transmitter, the plurality of command signals to the electronic device and adjust the volume output data of the electronic device.

In various embodiments, the method can be initiated by enabling a user to connect the volume adjusting apparatus to the electronic device for automatically adjusting the volume output data of the electronic device. Upon successful connection, the microprocessor detects the output data of the electronic device. When the microprocessor detects a first channel volume output data of the electronic device, a memory unit configured to the volume adjusting apparatus stores the first channel volume output data received at the microprocessor. When the user switches channels of the electronic device from one channel to another, the microprocessor detects a second channel volume output data of the electronic device. Further, the electronic control unit wirelessly or directly connected to the electronic device controls the second channel volume output data in response to the first channel volume output data stored in the memory unit of the microprocessor. Furthermore, enabling the user to apply at least one recall button of the volume adjusting apparatus and thereby maintains the same average volume while switching between two channels without entering the channel number or pressing the mute button. Then, the wireless transmitter transmits the plurality of command signals to the electronic device for the volume output data of the electronic device. Thus, when the user switches channels of the electronic device, the volume adjusting apparatus automatically adjusts the volume of the current television channel based on the volume of a previous channel to ensure a volume consistency.

An objective of the present invention is to provide a method and apparatus which automatically regulates a volume output of an electronic device.

Another objective of the present invention is to provide one or more recall buttons to enable a user to maintain the same average volume or a previously set volume while switching between two channels of an electronic device.

A further objective of the present invention is to provide a volume adjusting apparatus for adjust the volume on a current television channel based on the volume of a previous channels to ensure a volume consistency.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawing which does not limit the scope and the ambit of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Figure 1:
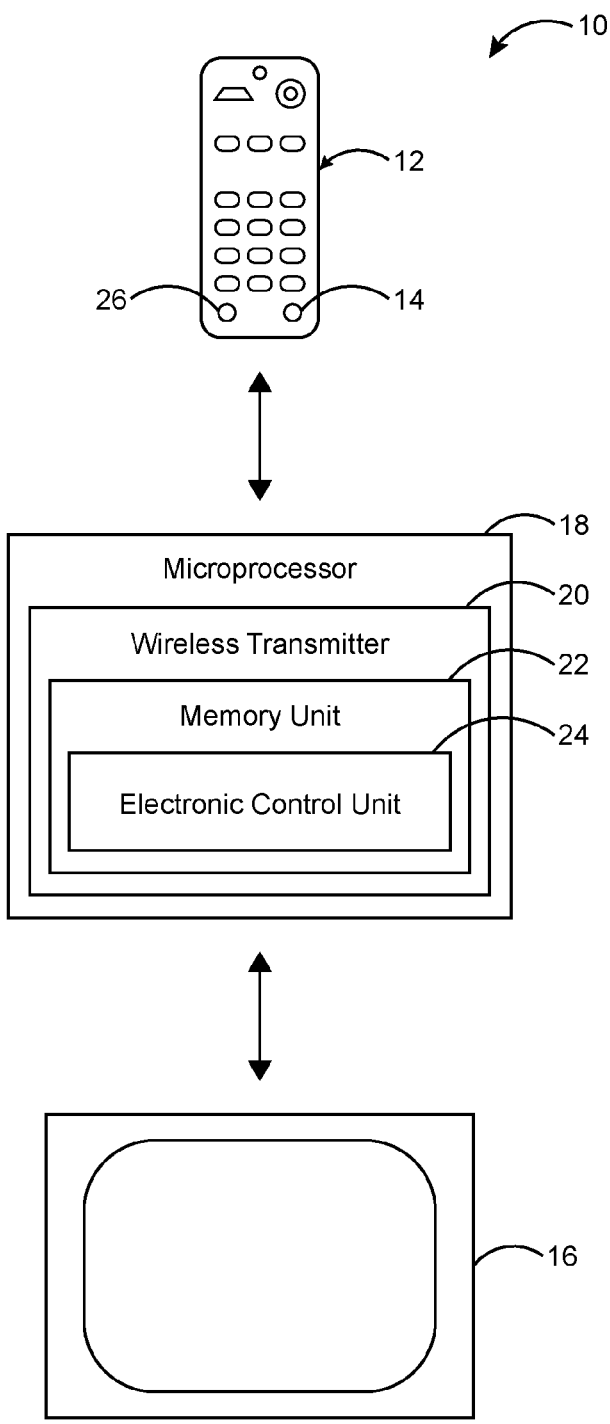
FIG. 1 is a functional block diagram of a volume adjusting apparatus operatively coupled with an electronic device.

Turning first to FIG. 1, a functional block diagram of a volume adjusting apparatus 10 for automatically adjusting a volume output of an electronic device 16 is illustrated. The volume adjusting apparatus 10 is a handheld remote controller 12 that includes at least one recall button 14 (similar to the "last" or "back button" for the last channel viewed) that allows a user to manually operate the volume of the electronic device 16 to automatically adjusts the volume on a current channel of the electronic device 16 based on the volume of the at least one previous channel to ensure a volume consistency. The remote controller 12 is programmed by the user for controlling a programming sequence of the electronic device 16 and adjusting the volume output of each program to the volume level of the previous channel as each program broadcasted on the electronic device 16.

Figure 2:
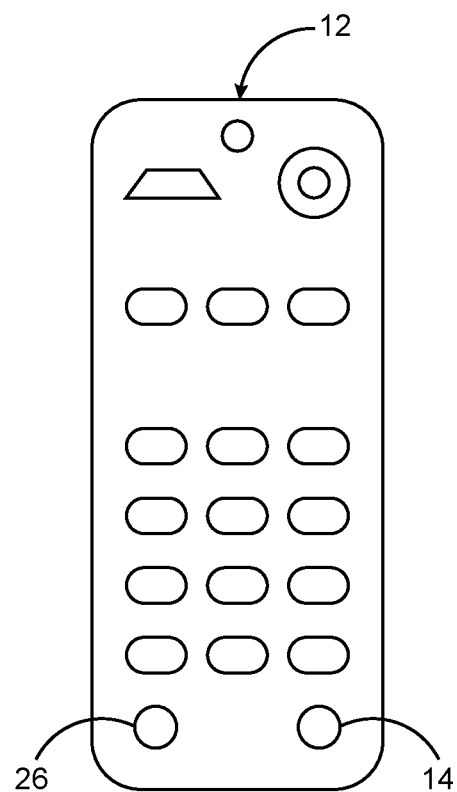
FIG. 2 illustrates a volume adjusting apparatus for automatically adjusting a volume output of the electronic device.

Referring to FIG. 1 and FIG. 2, the handheld remote controller 12 is provided to control the electronic device 16, and in particular to automatically adjusting the volume based on the volume of one or more previous channels to ensure volume consistency. The volume adjusting apparatus 10 comprises a microprocessor 18 capable of detecting an output data of the electronic device 16. A wireless transmitter 20 is configured to transmit to and receive wireless signals from the volume adjusting apparatus 10 for transmitting a plurality of command signals to the electronic device 16. An electronic control unit 24 wirelessly or directly connected to the electronic device 16 for controlling and automatically adjusting the volume output data of the electronic device 16 in accordance with a volume level of at least one previous channel wherein the volume level of the at least one previous channel is stored in a memory unit 22 and executable by the microprocessor 18.

The output data of the electronic device 16 includes at least one of audio data and video data. In some embodiments, the volume output can be adjusted to the volume level based on specific words in the audio data as predefined by the user. The plurality of command signals is configured to adjust the volume output data of the electronic device 16. The electronic device 16 displays a visual representation of the audio data when the volume output is adjusted to a muted state. The remote controller 12 is programmed by the user for controlling a programming sequence of the electronic device 16 and adjusting the volume output of each program to the volume level of the previous channel as each program broadcasted on the electronic device 16. In this embodiment, the remote controller 12 further includes at least one child protection audio button 26 that may automatically adjust the volume output to the volume level based on a plurality of censored words in the audio data as predefined by the user.

Figure 3:
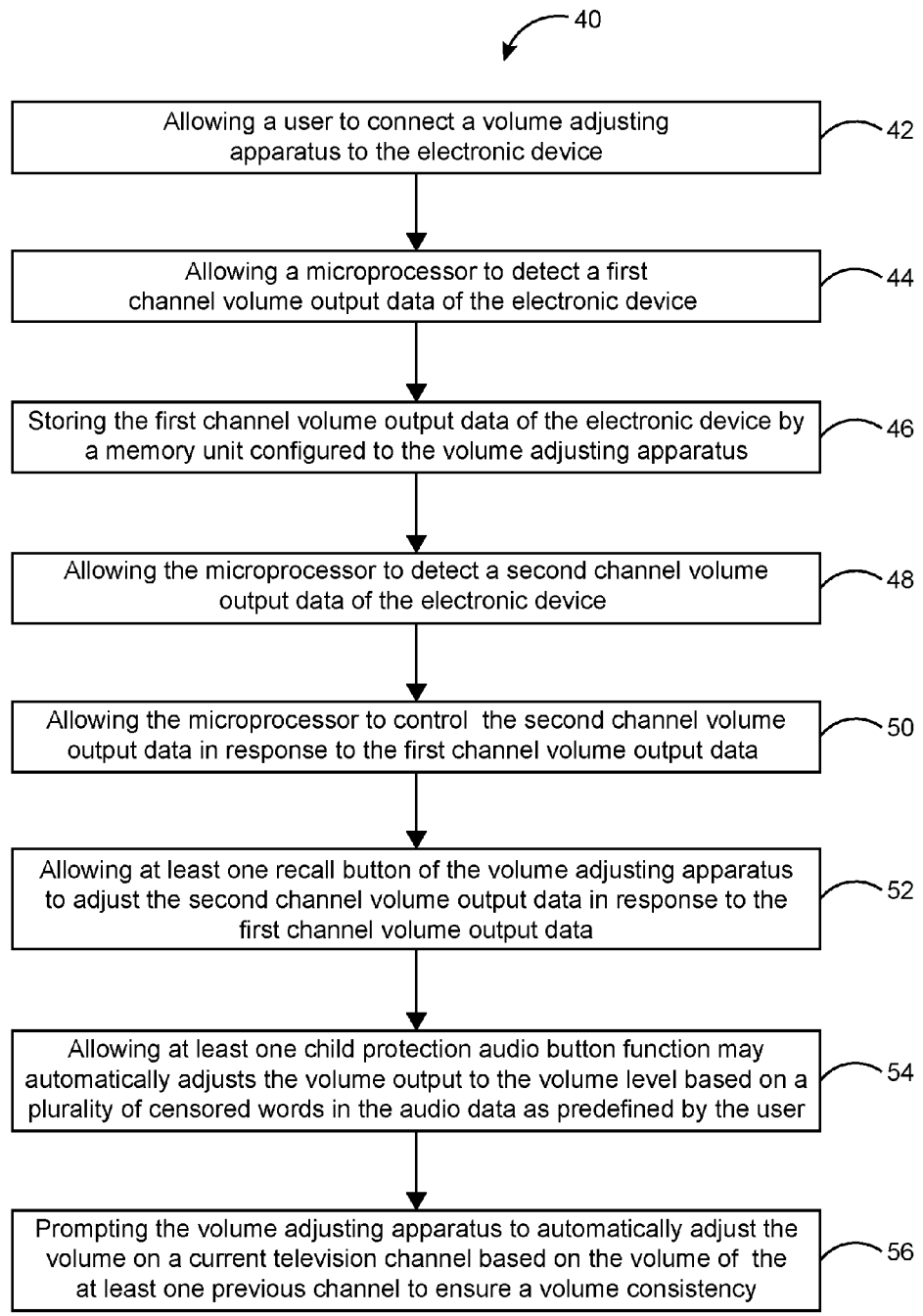
FIG. 3 illustrates a flowchart of a method for automatically adjust a volume output of an electronic device utilizing a volume adjusting apparatus.

FIG. 3 illustrates a flowchart of a method 40 for automatically adjusting a volume output of an electronic device utilizing a volume adjusting apparatus. The method 40 disclosed herein includes a volume adjusting apparatus that allows a user to connect the volume adjusting apparatus to an electronic device as indicated at block 42. The apparatus is executable by a microprocessor to detect a first channel volume output data of the electronic device as indicated at block. 44. In addition, the first channel volume output data of the electronic device stored in a memory unit is configured to the volume adjusting apparatus as indicated at block 46. The volume adjusting apparatus allows the microprocessor to detect a second channel volume output data of the electronic device as indicated at block 48. The apparatus allows the microprocessor to control the second channel volume output data in response to the first channel volume output data device as indicated at block. 50. The apparatus allows the user to manually operate the at least one recall button to adjust the second channel volume output data in response to the first channel volume output data as indicated at block 52.

In some embodiments, allowing at least one child protection audio button function may automatically adjusts the volume output to the volume level based on a plurality of censored words in the audio data as predefined by the user as indicated at block 54. The volume adjusting apparatus automatically adjust the volume on a current television channel based on the volume of the at least one previous channel to ensure a volume consistency as indicated at block 56.

The child protection audio button is an optional feature. The apparatus 18 may include a memory unit 22 including software instructions and one or more microprocessors 18 configured to execute the software instructions. The one or more microprocessors 18 may be further configured to perform a matching technique by comparing the audio data associated with an upcoming scene to be played to the parental censored list stored in the memory unit 22 to determine whether the audio data represents parental censored words. The one or more censored words may be displayed on a display of an electronic device for selection by the user from a list previously compiled and stored in the memory unit 22. Alternatively, or additionally, the censored words can be manually entered by the user via a keypad associated with the electronic device or via a remote control such that the censored words are then stored within the memory unit 22.

When the user views a scene on the electronic device if the audio data matches one or more parental censored words, the apparatus automatically mutes the audio for a predetermined time period. The predetermined time period may be preset by the user. Additionally, in some embodiments, the censored text can be visually displayed during the time period of muting. It is again emphasized here that the child protection audio button function is optional.

In one embodiment, the at least one recall button 14 (See FIG. 1) enables the user to maintain the same average volume level while switching between two channels without the need to enter the channel number or adjust the volume level between the two channels.

In one embodiment, when viewing the electronic device 16 (See FIG. 1) for example, a television program and the volume spikes during a commercial or an action scene, such as a car chase or a helicopter crash, the user can simply press the recall button and adjust the volume to the user's preferred volume, without having to press the mute button or readjust the audio volume of the electronic device.

In one embodiment, the volume adjusting apparatus 16 (See FIG. 1) and method ensures the same average volume of television commercial advertisements to accompany and maintain the same average program volume.

In one embodiment, the volume adjusting apparatus 16 and the method continuously monitors and adjusts the audio to maintain the listener's preferred volume level across all channels, program sources, and content.

In some embodiments, the volume adjusting apparatus 16 (See FIG. 1) allows the user to select a preferred volume level for a more consistent and enjoyable listening experience.

In one embodiment, the volume adjusting apparatus 16 and method automatically measures, analyzes, and maintains consistent volume levels based on the user's preferences.

In some embodiments, the volume adjusting apparatus 10 and method includes a plurality of recall buttons 14, wherein the plurality of recall button is preset at a different volume level. For example, the user can preset a desired volume level for certain type of content and/or during predetermined time intervals. For instance, the user can preset the volume to operate at a low volume setting when the television (or another electronic device) is initially turned on during the early morning hours or late night hours to avoid disturbing others.

In one embodiment, the volume adjusting apparatus 10 (See FIG. 1) and method allows the user to program the remote controller 12 (See FIG. 1) to a preset volume level based on audio content such that when similar audio content is detected on another channel the system automatically adjusts the volume on the current channel according to the volume level preset on a previous channel. By way of example, the user may preset a first volume level for viewing sporting events. The user may then preset a second recall button to a second volume level for watching action movies. The volume adjusting apparatus 10 and method allows the user to preset the remote controller 12 to adjust the volume within the same program based on specific topics.

In various embodiments, the user can program the remote controller 12 (See FIG. 1) to automatically switch through a sequence of television programs displaying similar content at a preset volume level for such content.

In some embodiments, the user can program the remote controller 12 (See FIG. 2) to automatically switch through a plurality of television channels or television programs based on a predetermined sequence at a preset volume level.

In some embodiments, the volume adjusting apparatus 10 and method may provide a child protection audio button 26 (See FIG. 1) that functions for audio content. Typically, broadcasters, use a profanity delay or a censor bleep to prevent profanity or other undesirable material from being aired. In addition to these conventional methods of censoring profanity, the apparatus and method, according to the present invention, provide the users with an option to select from a preformatted word list and/or content list to enable users to create a user preferred parental censored-list such that the volume automatically adjusts to mute when such content airs in a pre-recorded program. The parental censored-lists include words and/or content that are objectionable to the adults. Namely, the apparatus can be programmed to automatically adjust the volume downward or to mute when preselected content is aired based on the user specific parental list.

In some embodiments, the volume adjusting apparatus 10 and method may be programmable by the user to visually display the censored text for adult users to read on the television screen, while the audio is muted from younger viewers who are not yet able to read such censored content. This feature enables the parents to have parental control while simultaneously perceiving the content of the muted audio.

Some embodiments include hardware and software which allows the users to set their own preferred volume levels and to control the system.

Various embodiments may also include a sound generating device controlled by the electronic control unit to produce sounds accordingly.

In some embodiments the volume adjusting apparatus 10 (See FIG. 1) is powered by at least one battery, which can be turned on or off by operating an on/off switch. The battery may be configured as a rechargeable battery that can be recharged when mounted to a charging base. Alternatively, the power source can be a replaceable power source, such as a replaceable battery. As the power source operates to provide power to the electronic circuit and other components, the electronic circuit operates to process inputs received to control the system and/or produce sound effects.

The electronic control unit 24 (See FIG. 1) can include a multi-processor system. The operation of the multi-processor system can be controlled by internal control software. The control software may include routines, programs, objects, components, and/or data structures that perform particular tasks that can be viewed as an operating system together with one or more applications. The operating system provides management and control functions which are utilized by the applications to offer user functions such as control of the system. A programmable remote control device having control features to adjust levels, change settings, and/or select programs can be used in conjunction with the system for wireless transmission of signals to an electronic device, such as a television, radio, cellphone, computers, stereo, and/or home entertainment system. The wireless protocol used may be, but not limited to Bluetooth, WIFI or Zigbee.

In various embodiments, the remote controller 12 (See FIG. 1) can be programmable to adjust sound levels with numerous possible programming sequences. The programmable remote controller allows the user to design and save numerous different sequences. The remote controller 12 can be configured to playback, for example, programmed television channel or television show sequences. The electronic control unit 24 (See FIG. 1) can operate in response to user selections, adjustments or preferences programmed, selected or entered by the user using the remote controller 12.

The programmable remote controller 12 (See FIG. 1) can be configured to wirelessly transmit remote control signals to control the electronic device 16 so that it can be controlled from a distance. Activation of the control features of the remote controller 12 by the user, such as pressing a button, rotating a thumbwheel, activating a touch-screen, or initiating voice activation, causes the remote controller to transmit an infrared or radio wave remote control signal as a command to a receiver of the electronic device for controlling it. The remote controller 12 can be configured with one or more buttons for as adjusting the sequence and/or the volume control to control the functions of the electronic device.

Therefore, according to the method and the apparatus of the present invention, when the user switches channels of the electronic device and automatically output the predetermined audio volume in response to each channel without re-adjusting the audio volume of the electronic device.

It will be apparent to those skilled in the art that various modifications and variations can be made to the remote controller 12 (See FIG. 1) and method of the present disclosure without departing from the scope its teachings.

The claimed subject matter has been provided here with reference to one or more features or embodiments. Those skilled in the art will recognize and appreciate that, despite of the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents.

The foregoing description of the preferred embodiment of the present invention has been presented for the purpose of illustration and description. It is not intended to be exhaustive or to limit the invention to the precise form disclosed. Many modifications and variations are possible in the remote controller of the above teachings. It is intended that the scope of the present invention not be limited by this detailed description, but by the claims and the equivalents to the claims appended hereto.

What is claimed is:

1. A method executable by a volume adjusting apparatus for automatically adjusting a volume output of an electronic device, the method comprising the steps of:
   receiving at the electronic device broadcasts of a plurality of television channels for viewing;
   connecting an electronic control unit, comprising a microprocessor with a memory unit, to configure the volume adjusting apparatus to the electronic device;
   storing channel volume output data of the electronic device by the memory unit;
   detecting a plurality of channel volume output data for a plurality of channels of the electronic device by the microprocessor;
   programming at least one television program topic into the memory unit;
   programming a television program topic volume for each of the at least one television program topic into the memory unit;
   programming at least one program content for each of the at least one program topic into the memory unit;
   programming a program content volume for each of the at least one program content into the memory unit;
   programming a mute time period into the memory unit;

determining a sequence of channels based on the at least one television program topic;

performing, by the microprocessor, channel selection and volume adjustment by:

automatically switching, by the microprocessor, through the plurality of television channels according to the channel sequence;

automatically adjusting, by the microprocessor, the volume of each of the plurality of channels to the television program topic volume as the microprocessor switches through the plurality of television channels according to the channel sequence;

automatically selecting, for broadcast on the electronic device, a channel from the plurality of television channels as the microprocessor switches through the plurality of television channels arranged according to the channel sequence;

for the selected channel, automatically adjusting, by the microprocessor, the volume of the selected channel which comprises audio data to the program content volume when the audio data matches the program content volume;

automatically adjusting, by the microprocessor, the volume of the selected channel to output a muting signal when the audio data matches one or more specific words as predefined by a user; and in response to muting the audio data, displaying an exact visual representation of the muted audio data on a display of the electronic device according to the mute time period.

2. The method of claim 1, wherein the volume adjusting apparatus is a remote controller capable of being programmed by the user for controlling the programming sequence of the channels into the electronic device and programming the adjusting of the volume output level of each program broadcasted on the electronic device.

3. The method of claim 1, further comprising:

programming at least one time interval into the memory unit;

programming a time interval volume for each of the at least one time intervals into the memory unit; and automatically adjusting, by the microprocessor, the volume of the selected channel to match the time interval volume during each of the at least one time intervals.

\* \* \* \* \*